W. G. BLACKLIDGE.
Saw-Gummers.
No. 140,672. Patented July 8, 1873.
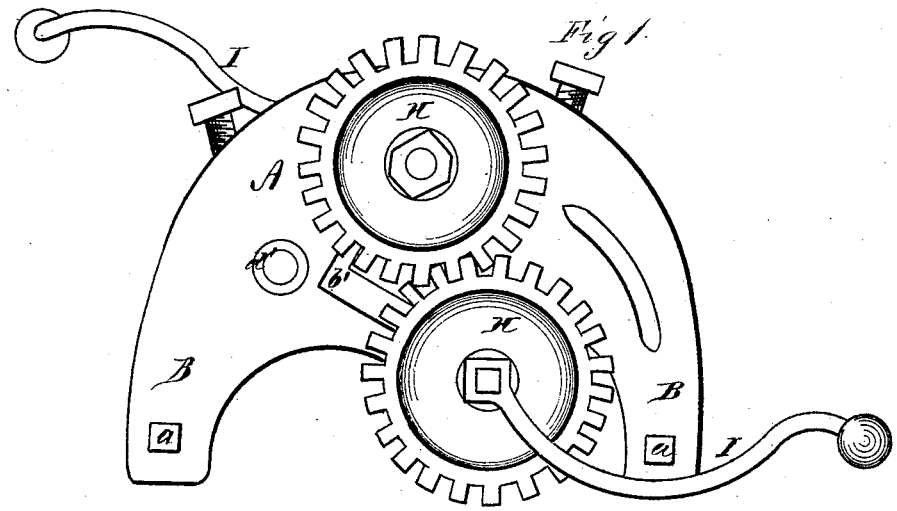
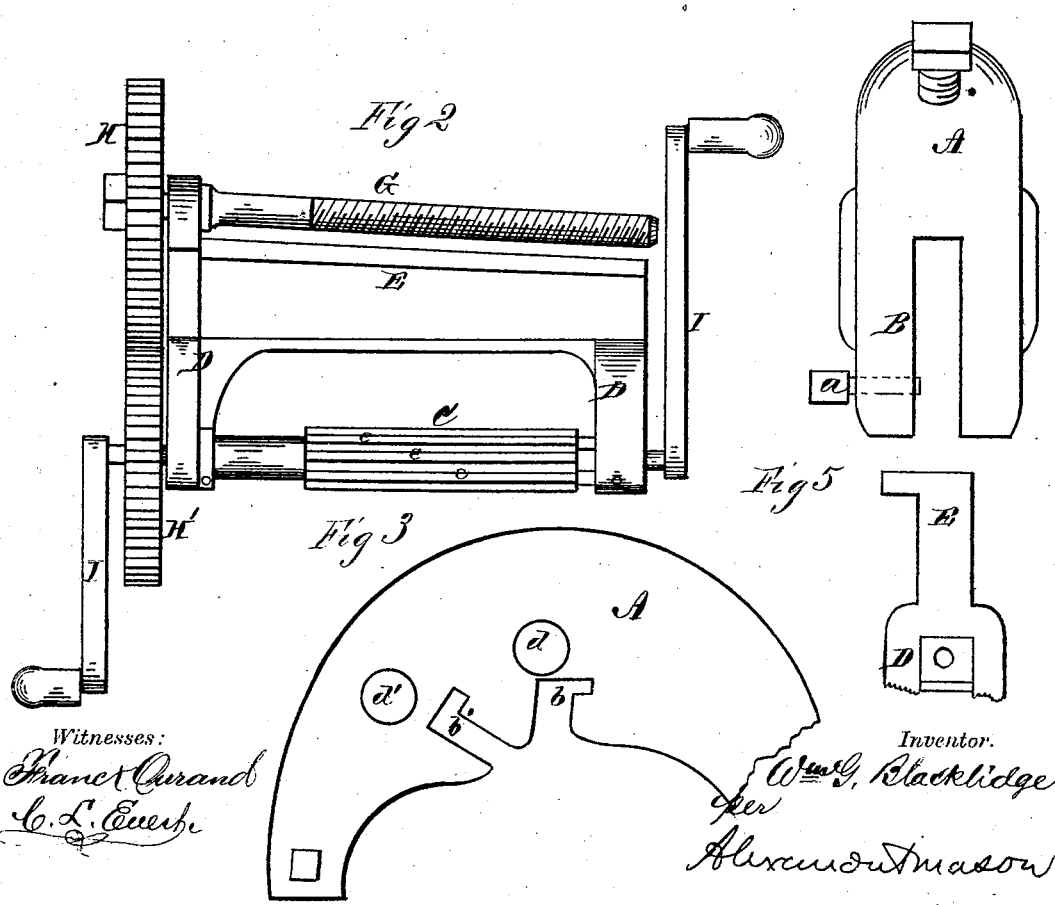
Witnesses:
Franc Durand
C. L. Everts
Inventor.
Wm. G. Blacklidge
per
Alexander Mason
Attorneys.

UNITED STATES PATENT OFFICE.

WILLIAM G. BLACKLIDGE, OF METAMORA, INDIANA, ASSIGNOR OF ONE-HALF TO JAMES P. ALLEY, OF CINCINNATI, OHIO.

IMPROVEMENT IN SAW-GUMMERS.

Specification forming part of Letters Patent No. 140,672, dated July 8, 1873; application filed April 11, 1873.

*To all whom it may concern:*

Be it known that I, WILLIAM G. BLACKLIDGE, of Metamora, in the county of Franklin and in the State of Indiana, have invented certain new and useful Improvements in Saw-Gummers; and do hereby declare that the following is a full, clear, and exact description thereof, reference being had to the accompanying drawings and to the letters of reference marked thereon making a part of this specification.

The nature of my invention consists in the construction and arrangement of a saw-gummer, wherein a shearing cut is made with a straight-toothed reamer by means of the automatic action of a screw and wedge combined, which gives the reamer an oblique motion, moving endwise and sidewise at the same time, as it has a rotary motion.

In order to enable others skilled in the art to which my invention appertains to make and use the same, I will now proceed to describe its construction and operation, referring to the annexed drawing, in which—

Figure 1 is a side view of my entire saw-gummer. Fig. 2 is a front view of the reamer with the screw and wedge. Figs. 3, 4, and 5, are views, showing detached portions of the machine.

A represents the frame, made substantially in the form shown, or in any other form that will answer the same purpose, and provided with slotted legs B B, to be placed over the edge of the saw, and secured to the same by set-screws *a a*. In the inner edge of and through the frame A are two L-shaped slots, *b b'*, and over the same screw-holes *d d'*, as shown. The slot *b* and screw-hole *d* are used while gumming straight saws, and the others while gumming circular saws. C represents the reamer, which is made or provided with a series of longitudinal straight teeth, *e*, and hung and revolving in a frame, D. The upper part of this frame forms or is provided with an L-shaped inclined bar or wedge, E, and above the same is a screw, G, running parallel with said bar and having its bearing in the side of the frame D where said screw is highest. On this end of the screw is a cog-wheel, H, gearing with a similar wheel, H', on the end of the reamer C, and on each end of the reamer-shaft is a crank, I, by means of which the same is revolved.

The L-shaped wedge or bar E being inserted in the slot *b*, or *b'*, and the screw G in the corresponding screw-hole, and the cranks I I turned, it will readily be seen that the reamer C; at the same time that it has a rotating motion, moves endwise and sidewise, thus giving a shearing cut with straight cutters.

Having thus fully described my invention, what I claim as new, and desire to secure by Letters Patent, is—

The combination of the reamer C, frame D, wedge E, screw G, gears H H', and cranks I I, all constructed and arranged as described, and operating in the frame A, substantially as and for the purposes herein set forth.

In testimony that I claim the foregoing I have hereunto set my hand this 28th day of March, 1873.

W. G. BLACKLIDGE.

Witnesses:
 J. KATHMAN,
 EDWARD ADLETA.